US011502979B2

(12) United States Patent
Nair

(10) Patent No.: US 11,502,979 B2
(45) Date of Patent: Nov. 15, 2022

(54) SYSTEM FOR MULTI-PARTY CHAT TECHNICAL FIELD

(71) Applicant: PayPal, Inc., San Jose, CA (US)

(72) Inventor: Rahul Nair, Leander, TX (US)

(73) Assignee: PayPal, Inc., San Jose, CA (US)

(*) Notice: Subject to any disclaimer, the term of this patent is extended or adjusted under 35 U.S.C. 154(b) by 0 days.

(21) Appl. No.: 17/364,264

(22) Filed: Jun. 30, 2021

(65) Prior Publication Data

US 2021/0328951 A1 Oct. 21, 2021

Related U.S. Application Data

(63) Continuation of application No. 16/023,789, filed on Jun. 29, 2018, now Pat. No. 11,082,372.

(51) Int. Cl.
*H04L 51/046* (2022.01)
*H04L 65/1066* (2022.01)
*G06F 40/30* (2020.01)
*H04M 1/72436* (2021.01)

(52) U.S. Cl.
CPC ............ *H04L 51/046* (2013.01); *G06F 40/30* (2020.01); *H04L 65/1066* (2013.01); *H04M 1/72436* (2021.01)

(58) Field of Classification Search
CPC ... G06F 40/30; H04L 51/046; H04L 65/1066; H04M 1/72436
See application file for complete search history.

(56) References Cited

U.S. PATENT DOCUMENTS

| 9,160,806 | B1 * | 10/2015 | Ledet | H04L 51/32 |
| 10,454,874 | B1 * | 10/2019 | Ledet | H04L 51/02 |
| 2011/0294525 | A1 | 12/2011 | Jonsson | |
| 2012/0179971 | A1 * | 7/2012 | Appelman | H04L 63/10 715/733 |
| 2014/0181219 | A1 | 6/2014 | Wang et al. | |
| 2014/0298210 | A1 * | 10/2014 | Park | G06F 3/0487 715/758 |
| 2016/0294755 | A1 | 10/2016 | Prabhu | |

* cited by examiner

*Primary Examiner* — Seth A Silverman
(74) *Attorney, Agent, or Firm* — Haynes and Boone, LLP

(57) ABSTRACT

A computer system analyzes an input in a chat window of a first device, wherein the chat window corresponds to a first chat session with a user of a second device and a second chat session with a user of a third device. The computer system determines, based on the analyzing the input, whether the input corresponds to an information associated with the first chat session and an information associated with the second chat session. Based on determining that the input corresponds to the information associated with the first chat session and the information associated with the second chat session, the computer system transmits the input to the second device and the third device.

20 Claims, 5 Drawing Sheets

SYSTEM FOR MULTI-PARTY CHAT

TECHNICAL FIELD

CROSS REFERENCE TO RELATED APPLICATIONS

This application is a Continuation of U.S. patent application Ser. No. 16/023,789, filed Jun. 29, 2018, which is incorporated by reference in its entirety.

TECHNICAL FIELD

The present disclosure relates to online chat, and more particularly to a system to provide a multi-party chat experience.

BACKGROUND

Chat systems have evolved a great deal since the creation of the user to user chat experience. Typically, a chat experience includes two users in a chat session where a person can type into a window, and select a user interface element to send a message to the other user. In newer chat implementations, a user may have multiple chats happening simultaneously, with each chat corresponding to a specific chat window that can be maximized or minimized. Furthermore, in a customer service environment, customer service agents typically are restricted by systems which only allow them to communicate with a single user at a time. This creates a situation where each customer's issues has to be addressed separately, which can lead to wait times and lower customer engagement. It would be advantageous to have a system which allows a heavy chat user, such as a customer service agent, to communicate in a more efficient way with customers.

DETAILED DESCRIPTION

Figure 1:
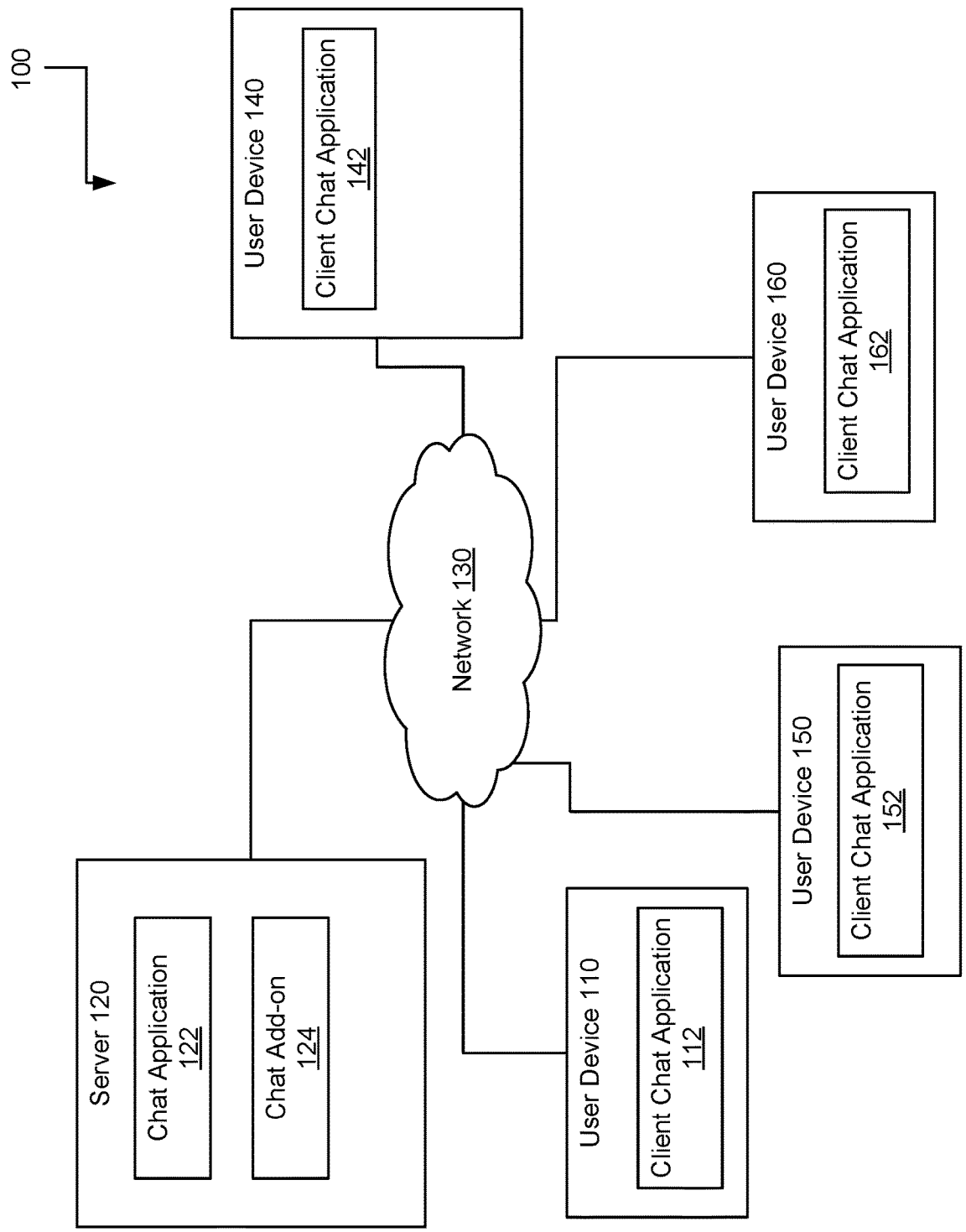
FIG. 1 illustrates a multi-chat system, in accordance with an embodiment.

Embodiments of the present disclosure provide a system, method, and program product. A computer system renders a user interface, with the user interface comprising a first communication user interface element displayed on a first device in association with a first chat session, wherein the first chat session is between a user of the first device and a user of a second device, wherein the first communication user interface element, when in a first state, allows a communication to be transmitted from the first device to the second device when a transmission user interface element is selected, and wherein the first communication user interface element, when in a second state, restricts the communication from being transmitted from the first device to the second device when the transmission user interface element is selected.

The user interface further comprises a second communication user interface element displayed on the first device in association with a second chat session, wherein the second chat session is between the user of the first device and a user of a third device, wherein the second communication user interface element, when in the first state, allows the communication to be transmitted from the first device to the third device when the transmission user interface element is selected, and wherein the second communication user interface element, when in the second state, restricts the communication from being transmitted from the first device to the third device when the transmission user interface element is selected.

Furthermore, in one or more embodiments, a computer system analyzes an input in a chat window of a first device, wherein the chat window corresponds to a first chat session with a user of a second device and a second chat session with a user of a third device. The computer system determines, based on the analyzing the input, whether the input corresponds to an information associated with the first chat session and an information associated with the second chat session. Based on determining that the input corresponds to the information associated with the first chat session and the information associated with the second chat session, the computer system transmits the input to the second device and the third device.

In the example embodiment, the present disclosure describes a solution to the problem of being able to communicate with multiple users more efficiently, or in some cases, simultaneously. In the example embodiment, the present disclosure describes a system that provides a first type of user interface element (referred to herein as a "communication user interface element") that when in a first state (such as an "open" or "on" state), may allow for information input into a chat window to be transmitted to be viewed by one or more parties participating in the chat session. For example, if a customer service agent is communicating with two customers in chat session, the present solution may render a communication user interface element corresponding to each customer that (if in the first state) allows the customer service agent to transmit a message input into the agent chat window to both customers simultaneously. Continuing the example, if the customer service agent does not want to transmit a message to a first customer of the two customers, the customer service agent may toggle the communication user interface element that corresponds to the first customer to be in a second state (a "closed" or an "off" state). Therefore, any message input into the agent chat window and transmitted will only be sent to the customers associated with a communication user interface element that is in the first state (the second customer).

In the example embodiment, the present disclosure describes a solution that may utilize natural language processing techniques to analyze a message input by a first user. The solution further describes determining one or more appropriate users for the message from a plurality of users participating a chat session with the first user. In response to determining the one or more appropriate users, the present solution further describes toggling (into a first state) one or more communication user interface elements corresponding to the one or more appropriate users, the one or more user interface elements being of a first type.

Embodiments of the present disclosure will now be described in detail with reference to the accompanying Figures.

FIG. 1 illustrates multi-chat system 100, in accordance with an embodiment. In the example embodiment, multi-chat system 100 includes server 120, user device 110, user device 150, user device 160, and user device 140 all connected via network 130.

In the example embodiment, network 130 may be, for example, a wired, a wireless or a fiber optic connection. In other embodiments, network 130 may be implemented as an intranet, a Bluetooth network, a local area network (LAN), or a wide area network (WAN). In general, network 130 may be any combination of connections and protocols that will support communications between computing devices, such as between server 120 and user device 110.

In the example embodiment, user device 110 includes client chat application 112. In the example embodiment, user device 110 may be a desktop computer, a laptop computer, a tablet computer, a mobile device, a handheld device, a thin client, or any other electronic device or computing system capable of receiving and sending data to and from other computing devices, such as server 120, via network 130. User device 110 is described in more detail with regard to the figures.

Client chat application 112 is a client-side application of server-side chat application 122 located on server 120. In the example embodiment, client chat application 112 is capable of initiating or receiving a request to initiate a chat session with another chat application, such as a client chat application on user device 150. Furthermore, client chat application 112 is capable of being utilized to input chat messages and receive chat message from another chat application, such as a chat application on user device 150. Client chat application 112 is described in more detail with regard to the figures.

In the example embodiment, user device 150 includes client chat application 152. In the example embodiment, user device 150 may be a desktop computer, a laptop computer, a tablet computer, a mobile device, a handheld device, a thin client, or any other electronic device or computing system capable of receiving and sending data to and from other computing devices, such as server 120, via network 130. User device 150 is described in more detail with regard to the figures.

Client chat application 152 is a client-side application of server-side chat application 122 located on server 120. In the example embodiment, client chat application 152 is capable of initiating or receiving a request to initiate a chat session with another chat application, such as a client chat application 112. Furthermore, client chat application 152 is capable of being utilized to input chat messages and receive chat message from another chat application, such as client chat application 112. Client chat application 152 is described in more detail with regard to the figures.

In the example embodiment, user device 160 includes client chat application 162. In the example embodiment, user device 160 may be a desktop computer, a laptop computer, a tablet computer, a mobile device, a handheld device, a thin client, or any other electronic device or computing system capable of receiving and sending data to and from other computing devices, such as server 120, via network 130. User device 160 is described in more detail with regard to the figures.

Client chat application 162 is a client-side application of server-side chat application 122 located on server 120. In the example embodiment, client chat application 162 is capable of initiating or receiving a request to initiate a chat session with another chat application, such as a client chat application 112. Furthermore, client chat application 162 is capable of being utilized to input chat messages and receive chat message from another chat application, such as client chat application 112. Client chat application 162 is described in more detail with regard to the figures.

In the example embodiment, user device 140 includes client chat application 142. In the example embodiment, user device 140 may be a desktop computer, a laptop computer, a tablet computer, a mobile device, a handheld device, a thin client, or any other electronic device or computing system capable of receiving and sending data to and from other computing devices, such as server 120, via network 130. User device 140 is described in more detail with regard to the figures.

Client chat application 142 is a client-side application of server-side chat application 122 located on server 120. In the example embodiment, client chat application 142 is capable of initiating or receiving a request to initiate a chat session with another chat application, such as a client chat application 112. Furthermore, client chat application 142 is capable of being utilized to input chat messages and receive chat message from another chat application, such as client chat application 112. Client chat application 142 is described in more detail with regard to the figures.

In the example embodiment, server 120 includes chat application 122 and chat add-on 124. In the example embodiment, server 120 may be a desktop computer, a laptop computer, a tablet computer, a mobile device, a handheld device, a thin client, or any other electronic device or computing system capable of receiving and sending data to and from other computing devices, such as user device 110, via network 130. Although not shown, optionally, server 120 can comprise a cluster of servers executing the same software to collectively process requests as distributed by a front-end server and a load balancer. In the example embodiment, server 120 is a computing device that is optimized for the support of applications that reside on server 120, such as chat application 122 and chat add-on 124, and for the support of requests related to the applications which reside on server 120. Server 120 is described in more detail with regard to the figures.

Chat application 122 is a server-side chat application capable of receiving requests from client chat applications, such as requests to initiate chat sessions, and further chat application 122 is capable of facilitating chat sessions between two or more client chat applications. Chat application 122 is described in more detail with regard to the figures.

Chat add-on 124 is an application that may be fully integrated, partially integrated or a separate application form chat application 122. In the example embodiment, chat add-on 124 is capable of transmitting information to one or more client chat applications (directly or via chat application 122), that may cause one or more communication user interface elements to be rendered on a display corresponding to the one or more client chat applications. Furthermore, chat add-on 124 may configure and facilitate the use of the rendered communication user interface elements by causing the transmission of information between client chat applications to be allowed or disallowed based on the state of one or more corresponding communication user interface elements. Furthermore, in the example embodiment, chat add-on 124 is capable of analyzing input in a chat window and determining whether to change a state associated with one or more communication user interface elements. In addition, rather than altering a state associated with one or more communication user interface elements based on an analysis of the input in a chat window, chat add-on 124 may provide a prompt that suggests one or more communication user interface elements to alter. Chat add-on 124 is described in more detail with regard to the figures.

Figure 2:
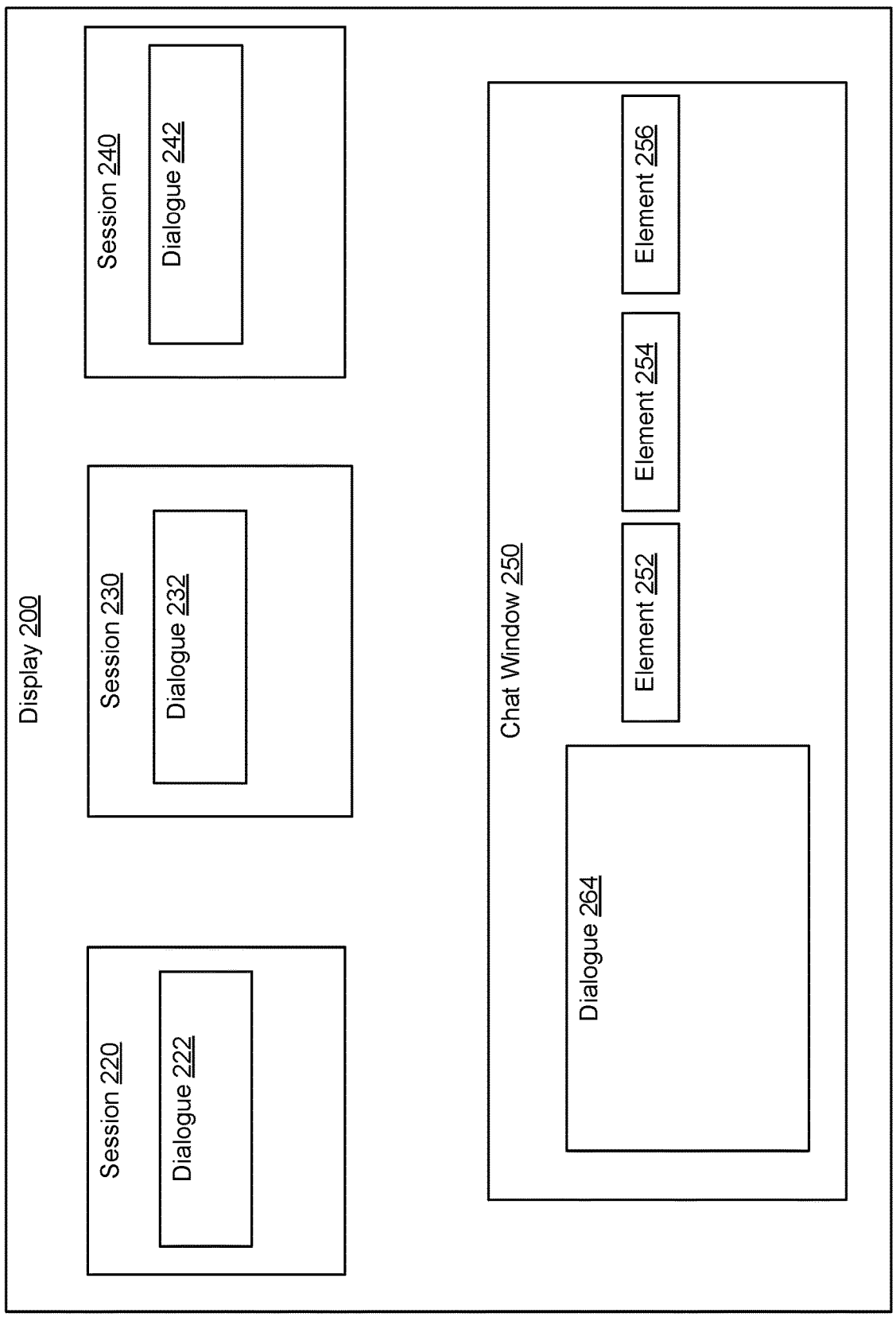
FIG. 2 depicts an illustration of a user interface display of a chat experience, in accordance with an embodiment.

FIG. 2 depicts an illustration of a chat experience between multiple users, in accordance with an embodiment. In the example embodiment, FIG. 2 depicts an illustration of a user interface display 200 of a chat experience from the perspective of a user, such as the user of user device 110. In the example embodiment, chat window 250 may include a dialogue box 264 where the user of user device 110 may input a message, communication user interface element 252, communication user interface element 254, and communication user interface element 256.

In the example embodiment, session 220 may represent a chat session between user device 110 and user device 140 (with both parties having visibility to the content of session 220), session 230 may represent a chat session between the user device 110 and user device 150 (with both parties having visibility to the content of session 220), and session 240 may represent a chat session between the user device 110 and user device 160 (with both parties having visibility to the content of session 240). In other embodiments, session 220, session 230, and session 240 may represent a chat session between more than two parties. For example, even though session 220 corresponds to a chat session between user device 110 and user device 140, the chat session may further include chat communications from another user, such as a user of user device 150, with the user of user device 150 being a full or partial participant in the chat session. For example, the user of user device 150 may have full visibility to the content of the chat session between the user of the user device 110 and the user of the user device 140. In another example, the user of user device 150 may be able to transmit messages that are visible in session 220 (by the user of user device 110 and the user of user device 140), but may have partial or no visibility to the content of the chat session transmitted by the other participants (i.e., the user of user device 110 and the user of user device 140).

Furthermore, dialogue box 222 may represent a dialogue box that includes the messages transmitted by the chat participants of session 220 (such as the user of user device 110 and the user of user device 140). In addition, dialogue box 232 may represent a dialogue box that includes the messages transmitted by the chat participants of session 230 (such as the user of user device 110 and the user of user device 150). Further, dialogue box 242 may represent a dialogue box that includes the messages transmitted by the chat participants of session 240 (such as the user of user device 110 and the user of user device 160). In other embodiments, the dialogue boxes referenced above may include messages transmitted by additional participants.

Furthermore, in the example embodiment, communication user interface element 252 may be utilized by the user of user device 110 to control whether a chat communication input in dialogue box 264 will be transmitted from user device 110 to user device 140. For example, if communication user interface element 252 is in a first state (an "open" or "on" state), a communication input into dialogue box 264 may be transmitted to user device 140 (if a transmit or send option is selected), and therefore, may be visible in dialogue box 222 of chat session 220. If communication user interface element 252 is in a second state (a "closed" or "off" state), a communication input into dialogue box 264 will not be transmitted to user device 140 (if a transmit or send option is selected). Similarly, communication user interface element 254 may be utilized by the user of user device 110 to control whether a chat communication input in dialogue box 264 will be transmitted from user device 110 to user device 150, and further, communication user interface element 256 may be utilized by the user of user device 110 to control whether a chat communication input in dialogue box 264 will be transmitted from user device 110 to user device 160.

Figure 3:
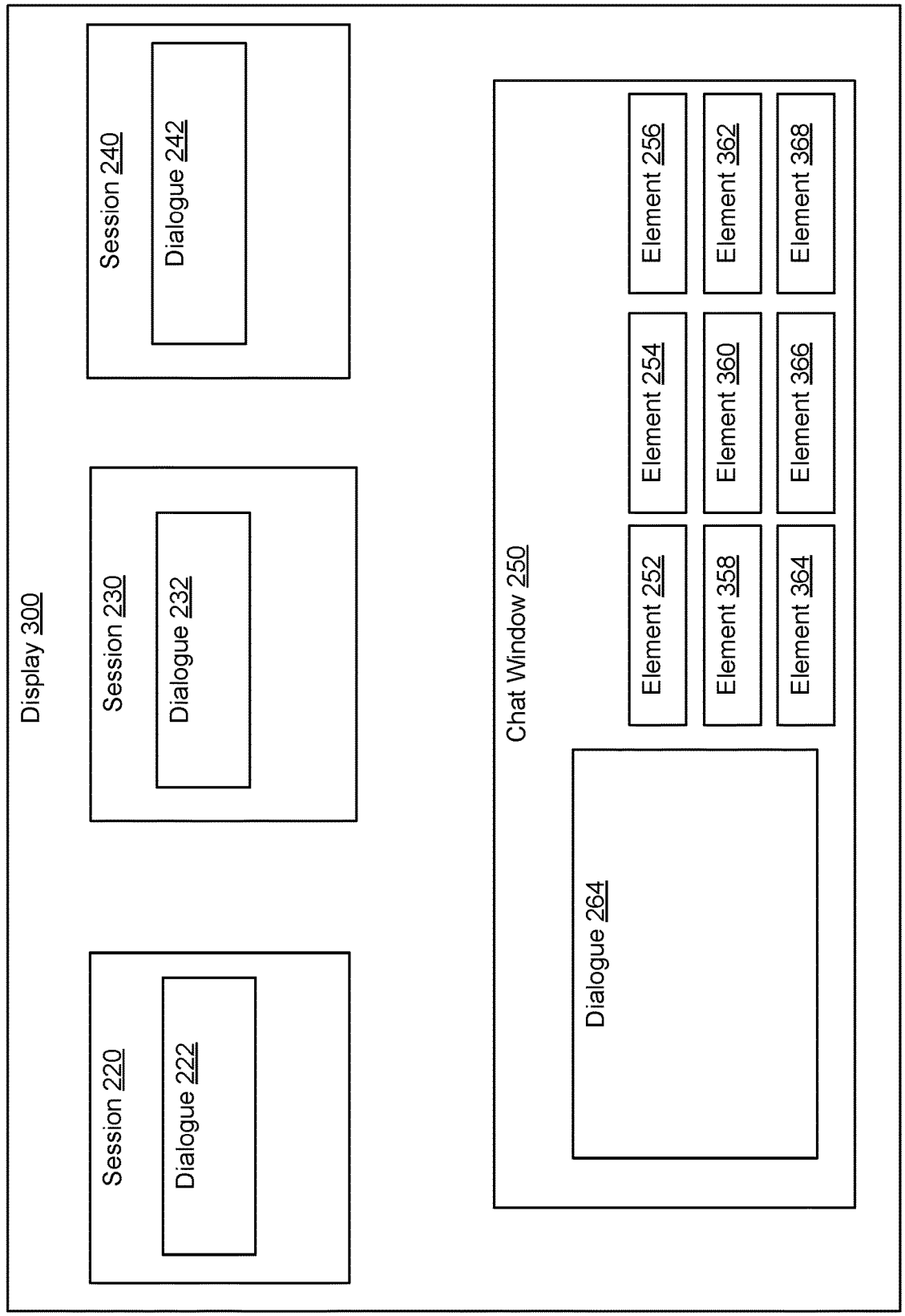
FIG. 3 depicts an illustration of an alternative embodiment of the user interface display of FIG. 2, in accordance with an embodiment.

In the example embodiment, the user of user device 110 may utilize communication user interface elements 252, 254, and 256 to transmit a message input into dialogue box 264 to one device or multiple devices. In other words, by utilizing communication user interface elements 252, 254, and 256, the user of user device 110 may communicate in multiple chat sessions FIG. 3 depicts an illustration of an alternative embodiment of the user interface display of FIG. 2 (the alternative embodiment referred to as user interface display 300), in accordance with an embodiment. In the example embodiment, with regard to user interface display 300 illustrated in FIG. 3, chat window 250 may additionally include communication user interface element 358, communication user interface element 360, communication user interface element 362, communication user interface element 364, communication user interface element 366, and communication user interface element 368.

In the example embodiment, communication user interface element 358 may be utilized by the user of user device 110 to control whether a chat communication can be transmitted from user device 140 to user device 150, while communication user interface element 364 may be utilized by the user of user device 110 to control whether a chat communication can be transmitted from user device 150 to user device 140. Further, communication user interface element 360 may be utilized by the user of user device 110 to control whether a chat communication can be transmitted from user device 150 to user device 160, while communication user interface element 366 may be utilized by the user of user device 110 to control whether a chat communication can be transmitted from user device 160 to user device 150. In addition, communication user interface element 362 may be utilized by the user of user device 110 to control whether a chat communication can be transmitted from user device 140 to user device 160, while communication user interface element 368 may be utilized by the user of user device 110 to control whether a chat communication can be transmitted from user device 160 to user device 140.

For example, if communication user interface element 252 is in a first state and communication user interface element 364 is also in a first state, chat session 220 may include chat communications input by the user of user device 140, chat communications transmitted to user device 140 by the user of user device 110, and chat communications transmitted to user device 140 by the user of user device 150. Therefore, dialogue box 222 (which may be visible to the user of user device 110, and may also be visible to the user of user device 140) may include chat communications from the user of user device 110, from the user of user device 140, and from the user of user device 150. However, if communication user interface element 254 and communication user interface element 358 are in the second state, the chat communications from the user of user device 110 and the user of user device 140 may not be present in dialogue box 232 (and therefore, may not be visible to the user of user device 150).

Furthermore, in the example embodiment, chat add-on 124 may configure the communication user interface elements depicted in FIGS. 2 and 3, such as communication user interface element 252, and cause the communication user interface elements to be rendered on user device 110, such as in chat window 250, as illustrated in FIGS. 2 and 3. As stated above, the communication user interface elements may be configured by chat add-on 124 to have two associated states (a first state and a second state). For example, if communication user interface element 252 is toggled to be in the second state ("closed" or "off" state) and communication user interface element 254 is toggled to be in the first state ("on" or "open" state), a communication input into dialogue box 264 will not be transmitted to user device 140, but will be transmitted to user device 150. In one or more embodiments, a corresponding chat application may refer to the states of communication user interface elements in determining whether to transmit a communication to a particular device. For example, client chat application 112 may reference that state of communication user interface element 252 in determining whether to transmit a communication in dialogue box 264 to user device 140. Therefore, if client chat application 112 determines that communication user interface element 252 is in a second state, client chat application 112 may not transmit a communication in dialogue box 264 to user device 140. In other embodiments, chat add-on 124 may (based on referencing the corresponding communication user interface element) intercept the communication (transmitted by user device 110) to prevent the communication from being transmitted to user device 140.

Figure 4:
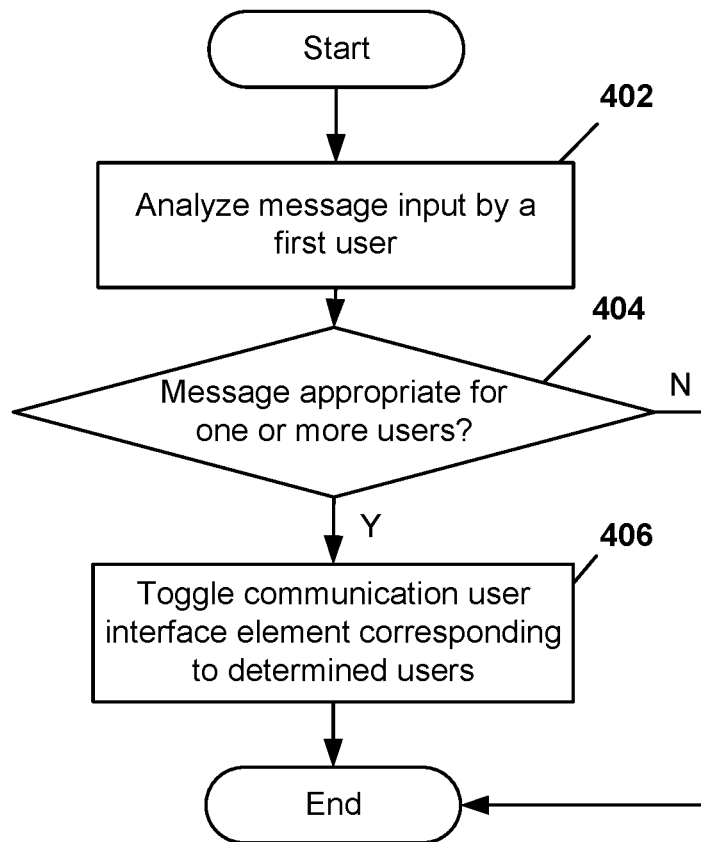
FIG. 4 is a flowchart illustrating the operations of the chat add-on of FIG. 1, in accordance with an embodiment.

FIG. 4 is a flowchart illustrating the operations of chat add-on of 124, in accordance with an embodiment. In the example embodiment, chat add-on 124 may analyze a message input by a first user, such as a message input by the user of user device 110 into dialogue box 264 (step 402). In the example embodiment, chat add-on 124 may utilize natural language processing techniques to analyze the message.

Furthermore, based on analyzing the message, chat add-on 124 may determine if the message is appropriate for one or more users (decision 404). For example, for an interaction between a customer service agent and one or more customers, a customer (the user of user device 140) may input a question or a message into a chat window, such as in chat session 220. The customer question may then be categorized and the customer may be routed to a customer service agent that corresponds to the category. For example, a customer that inputs a question corresponding to logging into an account, may be routed to a customer service agent that deals with login issues. Chat add-on 124 may then further analyze the customer input and may identify a second level category(s) (or one or more identifiers) based on an analysis of the customer input. For example, the second level analysis may identify that the question corresponds to being locked out of an account. In other embodiments, rather than performing two levels of analysis, a single thorough analysis may be done at the outset by chat add-on 124 or by a similar application.

Chat add-on 124 may then analyze an input in dialogue box 264 (utilizing natural language processing techniques) and determine if the input is appropriate for the customer. In other words, chat add-on 124 may determine if the input in dialogue box 264 corresponds to a potential answer or may provide useful information for the customer.

In one or more embodiments, upon analyzing the customer input and determining one or more identifiers corresponding to the input, chat add-on 124 may access a database to identify one or more additional related identifiers or input that correspond to the determined one or more identifiers. Chat add-on 124 may utilize the additional related identifier in determining whether the input in dialogue box 264 corresponds to a potential answer or may provide useful information for the customer. For example, chat add-on 124 may analyze the input in dialogue box 264 to determine if the input in dialogue box 264 corresponds to the determined one or more identifiers and further may determine if the input in dialogue box 264 corresponds to the one or more additional related identifiers. In one or more embodiments, analyzing the input in dialogue box 264 may include determining one or more corresponding identifiers, and further the one or more identifiers that correspond to dialogue box 264 may be compared to the one or more identifiers corresponding to the customer/user input in order to determine if the input in dialogue box 264 is appropriate for the customer/user.

If chat add-on 124 determines the input in dialogue box 264 is not appropriate for one or more users (decision 404, "NO" branch), chat add-on 124 may continue to monitor and analyze information input into dialogue box 264, as well as information input by other users (such as the user of user device 140).

If chat add-on 124 determines the input in dialogue box 264 is appropriate for one or more users (decision 404, "YES" branch), chat add-on 124 may toggle the communication user interface elements that correspond to the one or more users (step 406). For example, if chat add-on 124 determines that the user of user device 140 is an appropriate user for the input in dialogue box 264, chat add-on 124 may toggle communication user interface element 252 to be in a first state, so upon selection of a "submit" or "transmit" option, the message is transmitted to user device 140. Other communication user interface elements corresponding to users (and user devices) that were determined to not be appropriate for the input in dialogue box 264 may be kept or toggled to be in the second state. In other embodiments, rather than automatically toggling the communication user interface elements that correspond to the appropriate one or more users as stated above, chat add-on 124 may provide a suggestion or notification which may include information detailing the communication user interface elements that should be toggled to either a first state or a second state.

As described above, chat add-on 124 may automatically determine one or more appropriate users, and further may facilitate the transmission of a chat message to multiple user simultaneously.

As discussed above, upon initiation of a chat session, a customer/user may be categorized based on an input or question submitted into a chat. In one or more embodiments, upon analyzing additional input, chat add-on 124 may re-categorize a customer/user. The re-categorization may be useful in determining if the customer/user is an appropriate user for a message input into dialogue box 264.

Furthermore, while in the example embodiment, FIG. 4 is discussed as being performed by chat add-on 124, in one or more embodiments, chat add-on 124 may utilize a local application, such as client chat application to perform one or more steps discussed in FIG. 4, or the steps of FIG. 4 may be done entirely by a local application.

In addition, in one or more embodiments, chat add-on 124 may facilitate an interaction between one or more users of one or more applications (such as a chat application, messaging application, or an email client). For example, if the user of user device 110 is utilizing a first chat application, the user of user device 140 is using the first chat application and the user of user device 150 is utilizing a second chat application, chat add-on 124 may orchestrate the communication of information in a chat session taking place in the first chat application between the user of user device 110 and the user of user device 140 to be visible to the user of user device 150 within the second chat application. For example, chat add-on 124 may be configured to orchestrate communication between application programming interfaces of the first application and the second application. Therefore, the user of user device 110 may utilize chat add-on 124 to initiate a chat session with a user within the first application (i.e., the user of user device 140) and further, via orchestration of communication of the application programming interface of the second application, may utilize chat add-on 124 to initiate a chat session with a user within the second application (i.e., the user of user device 150). Furthermore, chat add-on 124 may be utilized to orchestrate communications between the first application and the second application in order to combine the sessions to allow the user of user device 150 to have visibility to the chat session between the user of user device 110 and the user of user device 140, and further may allow the user of user device 150 to communicate a message which is visible to the user of user device 110 and the user of user device 140 within the chat session in the first application.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
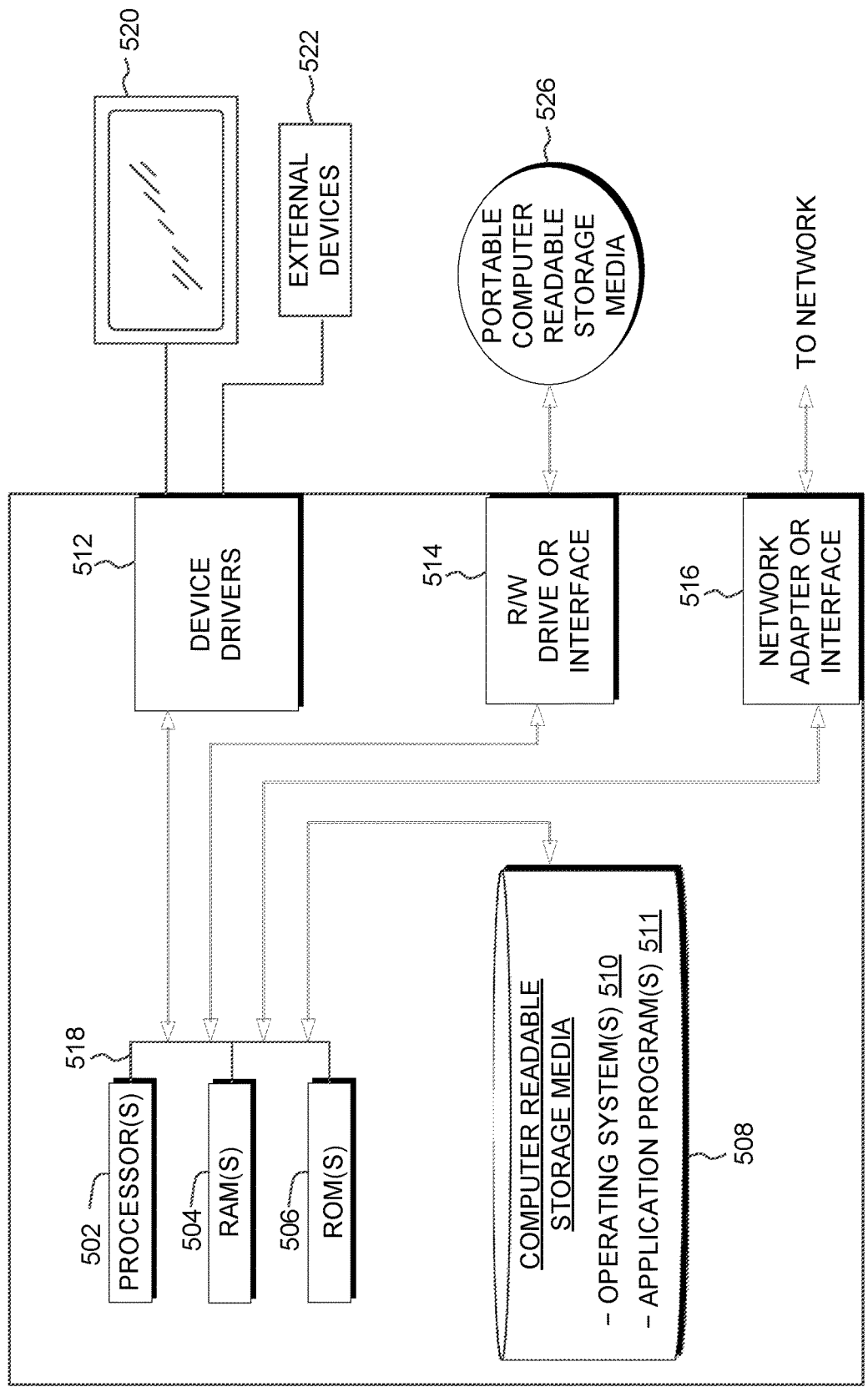
FIG. 5 is a block diagram depicting the hardware components of the multi-chat system of FIG. 1, in accordance with an embodiment.

FIG. 5 depicts a block diagram of components of one or more computing devices contained in multi-chat system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, chat add-on 124, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
one or more computer-readable memories storing program instructions; and
one or more processors configured to execute the program instructions to cause the computer system to perform operations comprising:
rendering a user interface, the user interface comprising:
a first communication user interface element displayed on a first device in association with a first chat session, wherein the first chat session is between a user of the first device and a user of a second device, wherein the first communication user interface element, when in a first state that is activated based on a natural language processing performed to the first chat session, allows a first communication to be transmitted from the first device to the second device when a transmission user interface element is selected, and wherein the first communication user interface element, when in a second state, restricts the first communication from being transmitted from the first device to the second device when the transmission user interface element is selected; and
a second communication user interface element displayed on the first device in association with a second chat session, wherein the second chat session is between the user of the first device and a user of a third device, wherein the second communication user interface element, when in the first state, allows the first communication to be transmitted from the first device to the third device when the transmission user interface element is selected, and wherein the second communication user interface element, when in the second state, restricts the first communication from being transmitted from the first device to the third device when the transmission user interface element is selected.

2. The computer system of claim 1, wherein the user interface further comprises a third communication user interface element displayed on the first device, wherein the third communication user interface element, when in the first state, allows a second communication to be transmitted from the second device to the third device, and wherein the third communication user interface element, when in the second state, restricts the second communication from being transmitted from the second device to the third device.

3. The computer system of claim 1, wherein the first communication user interface element, when in the first state, provides an indication to a first application to transmit the first communication to the second device.

4. The computer system of claim 1, wherein the first communication user interface element, when in the second state, provides an indication to a first application to not perform a transmission of the first communication to the second device.

5. The computer system of claim 1, wherein the first communication user interface element, when in the second state, provides an indication to a second application to intercept a transmission of the first communication.

6. The computer system of claim 1, wherein the user interface further comprises a chat window that is capable of displaying input from the user of the first device, wherein the first communication user interface element changes to the second state based on a determination that an input in the chat window does not correspond with the first chat session.

7. The computer system of claim 1, wherein the first chat session and the second chat session occur concurrently.

8. A method, comprising:
rendering a user interface, the user interface comprising:
a first communication user interface element displayed on a first device in association with a first chat session, wherein the first chat session is between a user of the first device and a user of a second device, wherein the first communication user interface element, when in a first state, allows a first communication to be transmitted from the first device to the second device when a transmission user interface element is selected, the first state being activated based on analyzing a content of the first chat session via natural language processing, and wherein the first communication user interface element, when in a second state, restricts the first communication from being transmitted from the first device to the second device when the transmission user interface element is selected; and
a second communication user interface element displayed on the first device in association with a second chat session, wherein the second chat session is between the user of the first device and a user of a third device, wherein the second communication user interface element, when in the first state, allows the first communication to be transmitted from the first device to the third device when the transmission user interface element is selected, and wherein the second communication user interface element, when in the second state, restricts the first communication from being transmitted from the first device to the third device when the transmission user interface element is selected.

9. The method of claim 8, wherein the user interface further comprises a third communication user interface element displayed on the first device, wherein the third communication user interface element, when in the first state, allows a second communication to be transmitted from the second device to the third device, and wherein the third communication user interface element, when in the second state, restricts the second communication from being transmitted from the second device to the third device.

10. The method of claim 8, wherein the first communication user interface element, when in the first state, provides an indication to a first application to transmit the first communication to the second device.

11. The method of claim 8, wherein the first communication user interface element, when in the second state, provides an indication to a first application to not perform a transmission of the first communication to the second device.

12. The method of claim 8, wherein the first communication user interface element, when in the second state, provides an indication to a second application to intercept a transmission of the first communication.

13. The method of claim 8, wherein the user interface further comprises a chat window that is capable of displaying input from the user of the first device, and wherein the first communication user interface element is in the second state based on a determination that an input in the chat window does not correspond with the first chat session.

14. The method of claim 8, wherein the first chat session and the second chat session occur concurrently.

15. A non-transitory machine-readable medium having stored thereon machine-readable instructions executable to cause a machine to perform operations comprising:
rendering a user interface, the user interface comprising:
a first communication user interface element displayed on a first device in association with a first chat session, wherein the first chat session is between a user of the first device and a user of a second device, wherein the first communication user interface element, when in a first state that is activated based performing a natural language processing to an interaction between the user of the first device and the user of the second device during the first chat session, allows a first communication to be transmitted from the first device to the second device when a transmission user interface element is selected, and wherein the first communication user interface element, when in a second state, restricts the first communication from being transmitted from the first device to the second device when the transmission user interface element is selected; and
a second communication user interface element displayed on the first device in association with a second chat session, wherein the second chat session is between the user of the first device and a user of a third device, wherein the second communication user interface element, when in the first state, allows the first communication to be transmitted from the first device to the third device when the transmission user interface element is selected, and wherein the second communication user interface element, when in the second state, restricts the first communication from being transmitted from the first device to the third device when the transmission user interface element is selected.

16. The non-transitory machine-readable medium of claim 15, wherein the user interface further comprises a third communication user interface element displayed on the first device, wherein the third communication user interface element, when in the first state, allows a second communication to be transmitted from the second device to the third device, and wherein the third communication user interface element, when in the second state, restricts the second communication from being transmitted from the second device to the third device.

17. The non-transitory machine-readable medium of claim 15, wherein the first communication user interface element, when in the first state, provides an indication to a first application to transmit the first communication to the second device.

18. The non-transitory machine-readable medium of claim 15, wherein the first communication user interface element, when in the second state, provides a first indication to a first application to not perform a transmission of the first communication to the second device and provides a second indication to a second application to intercept a transmission of the first communication.

19. The non-transitory machine-readable medium of claim 15, wherein the first chat session and the second chat session occur concurrently.

20. The non-transitory machine-readable medium of claim 15, wherein the first communication user interface element is in the second state based on a determination that an input from a user of the first device does not correspond with the first chat session.

* * * * *